US011287508B2

(12) United States Patent
Zalalutdinov et al.

(10) Patent No.: US 11,287,508 B2
(45) Date of Patent: Mar. 29, 2022

(54) FLOATING BASE VECTOR SENSOR

(71) Applicant: The Government of the United States of America, as represented by the Secretary of the Navy, Arlington, VA (US)

(72) Inventors: Maxim K. Zalalutdinov, Silver Spring, MD (US); Douglas M. Photiadis, Falls Church, VA (US); Joseph A. Bucaro, Herndon, VA (US); Brian H. Houston, Fairfax, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 810 days.

(21) Appl. No.: 15/970,369

(22) Filed: May 3, 2018

(65) Prior Publication Data

US 2019/0056473 A1    Feb. 21, 2019

Related U.S. Application Data

(60) Provisional application No. 62/500,550, filed on May 3, 2017.

(51) Int. Cl.
*G01S 3/803* (2006.01)
*G01H 9/00* (2006.01)
(Continued)

(52) U.S. Cl.
CPC ........... *G01S 3/8034* (2013.01); *G01F 1/704* (2013.01); *G01H 9/00* (2013.01); *G01P 5/26* (2013.01); *G01S 3/801* (2013.01); *G01F 1/28* (2013.01)

(58) Field of Classification Search
CPC combination set(s) only.
See application file for complete search history.

(56) References Cited

U.S. PATENT DOCUMENTS 4,138,658 A * 2/1979 Avedik ..................... G01V 1/38
181/110
6,951,138 B1 * 10/2005 Jones .................... G01V 1/3852
73/769

(Continued)

OTHER PUBLICATIONS

International Search Report for PCT/US2018/030889 from the International Searching Authority, dated Aug. 27, 2018.
(Continued)

*Primary Examiner* — Isam A Alsomiri
*Assistant Examiner* — Amie M Ndure
(74) *Attorney, Agent, or Firm* — US Naval Research Laboratory; William P. Ladd

(57) ABSTRACT

Systems and methods are provided for sensing acoustic signals using a floating base vector sensor. A vector sensor according to an embodiment of the present disclosure can be used to detect and characterize low frequency sound wave(s) in a viscous medium (e.g., air, water, etc.) by detecting a periodic motion of the media particles associated with the sound wave(s). The orientation of the particle velocity deduced from such measurements can provide information regarding the wave vector of the sound wave(s), can define the direction of arrival (DOA) for the acoustic signal, and can assist locating the source of the sound of interest.

20 Claims, 4 Drawing Sheets

(51) Int. Cl.
  *G01F 1/704* (2006.01)
  *G01P 5/26* (2006.01)
  *G01S 3/801* (2006.01)
  *G01F 1/28* (2006.01)

(56) References Cited

U.S. PATENT DOCUMENTS

| | | | |
|---|---|---|---|
| 8,085,622 | B2 | 12/2011 | Donskoy et al. |
| 9,383,471 | B2* | 7/2016 | Tamanaja ............... G01V 1/3852 |
| 2005/0034519 | A1 | 2/2005 | Deng |
| 2011/0033062 | A1* | 2/2011 | Deng ..................... H04R 3/005 |
| | | | 381/92 |
| 2013/0312522 | A1 | 11/2013 | Deng |
| 2014/0203184 | A1* | 7/2014 | Purdy .................... G01N 21/17 |
| | | | 250/393 |
| 2016/0252391 | A1 | 9/2016 | Linne et al. |
| 2018/0275313 | A1* | 9/2018 | Pierik .................... G01S 19/14 |

OTHER PUBLICATIONS

Written Opinion for PCT/US2018/030889 from the International Searching Authority, dated Aug. 27, 2018.

International Preliminary Report on Patentablility for PCT/US2018/030889 from the International Searching Authority, dated Aug. 27, 2018.

Kang Kim, Thomas B. Gabrielson, Gerald C. Lauchie, "Development of a Accelerometer-Based Underwater Acoustic Intensity Sensor", Acoustic Society America vol. 116, pp. 3384 (2004).

Zhang Guojun et al. "Improvement of the MEMS Bionic Vector Hydrophone," Microelectronics Journal vol. 42, pp. 815-819 (2011).

Bucaro et al., "Compact Directional Acoustic Sensor Using a Multi-Fiber Optical Probe", Acoustic Society of America 133, 832-841 (2013).

Leslie et al., "Hydrophone for Measuring Particle Velocity" Acoustic Society of America vol. 28, pp. 711 (1956).

* cited by examiner

FLOATING BASE VECTOR SENSOR

CROSS REFERENCE TO RELATED APPLICATIONS

This application claims the benefit of U.S. Provisional Patent Application No. 62/500,550, filed on May 3, 2017, which is incorporated by reference herein in its entirety.

FIELD OF THE DISCLOSURE

This disclosure relates to sensors, including floating sensors.

BACKGROUND

The detection and characterization of sound waves propagating in viscous mediums, such as air or water, is useful for a variety of applications. One factor in detection and characterization of acoustic signals is determining the direction of arrival (DOA) of the acoustic signal. Conventional methods for detecting the DOA of acoustic signals have several limitations, especially for low frequency signals. For example, a traditional method of detecting the DOA for underwater acoustics waves is based on measuring the relative phase or pressure gradient in the sound wave using arrays of spatially separated pressure sensors (hydrophones). The applicability of this multi-sensor method for low frequency acoustic signals is limited by the large size of the arrays (monopole separation comparable to the wavelength of the sound) required to provide the directionality.

An accelerometer implemented as a neutrally buoyant body immersed in the sound wave underwater provides an alternative established method for detecting the orientation of the acoustic wave vector that is collinear with the acceleration of the water particles. The sensitivity of such accelerometers diminishes as the frequency decreases, since the acceleration itself drops proportionally to the frequency and the transducer noise increases as inverse frequency. As a result, the test mass required for operating the accelerometer in 10 Hz frequency range can become prohibitively large.

Micromechanical sensors have been recently proposed as vector sensors for underwater acoustics. Depending on the geometry of the micromechanical device, the read-out signal (i.e., the deformation of the sensor) can be dominated by one of the sound wave components: either by the pressure gradient within the sound wave or by the viscous forces arising from the periodic motion of the surrounding water particles. While promising for applications in very low frequency underwater acoustics, micromechanical vector sensors have two major drawbacks in practical implementations: (i) the amount of deformation to be measured is very small and (ii) the sensor is assumed to be somehow rigidly mounted underwater (i.e. the displacement of the flexible, sound sensitive parts of the micromechanical sensor are measured with respect to a rigid base). Both difficulties in achieving an acceptable signal-noise ratio and the necessity to attach the sensor to a fixed structure underwater are seen as major obstacles for practical deployment of micromechanical vector sensors.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Figure 1:
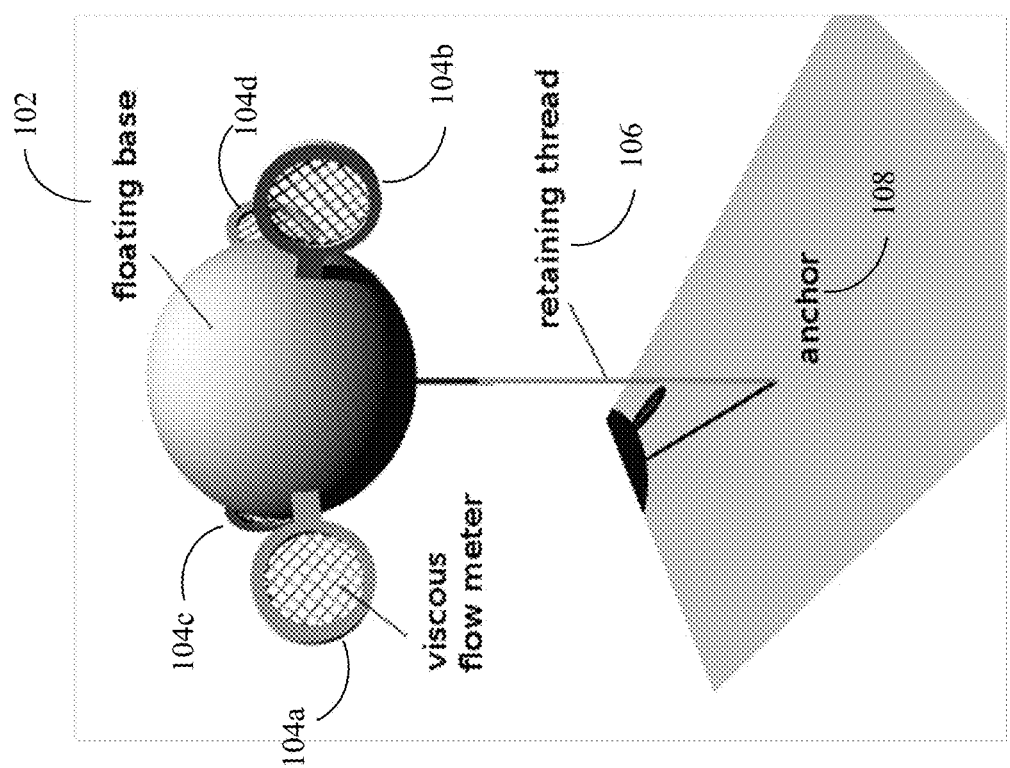
FIG. 1 is a diagram of a floating base vector sensor in accordance with an embodiment of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

1. OVERVIEW

Embodiments of the present disclosure provide systems and methods for sensing acoustic signals that address limitations of prior systems. For example, a vector sensor according to an embodiment of the present disclosure can be used to detect and characterize low frequency sound wave(s) in a viscous medium (e.g., air, water, etc.) by detecting a periodic motion of the media particles associated with the sound wave(s). The orientation of the particle velocity deduced from such measurements can provide information regarding the wave vector of the sound wave(s), can define the direction of arrival (DOA) for the acoustic signal, and can assist locating the source of the sound of interest.

A vector sensor in accordance with an embodiment of the present disclosure can exploit an acoustically-induced normal displacement of fine mesh as a measure of the collinear projection of the particle velocity in the sound wave. In an embodiment, the acoustically induced flow force on an individual fiber within the mesh is nearly independent of the fiber diameter, and the mesh-flow interaction can be well-described theoretically by a nearest neighbor coupling approximation. Scaling arguments based on these two observations indicate that the refinement of the mesh down to the nanoscale leads to significant improvements in performance. The combination of the two dimensional nature of the mesh together with the nano-scale dimensions provides a dramatic gain in the total length of fiber exposed to the flow, leading to a sensitivity enhancement by orders of magnitude.

Embodiments of the present disclosure can be used in a variety of applications. For example, embodiments of the present disclosure can be used to detect sound waves in water in the vicinity of pressure-release surfaces (e.g., a water-air boundary, hull(s) of submerged vessels at low frequencies, etc.). More generally, a mesh-type velocimeter in accordance with an embodiment of the present disclosure can be used for monitoring slowly-varying viscous flow down to the DC limit.

2. LOW FREQUENCY ACOUSTIC SENSORS

Compact, lightweight, low power directional acoustic sensors capable of operating at low frequency can be enabling for numerous applications, such as acoustic source localization. In underwater acoustics, where sub-100 Hz frequency ensures long range propagation for sound waves, such sensors provide the ability to look over narrow angular apertures thus discriminating against the signals from interfering noise sources and providing target bearing information with very small sensor packages.

A major obstacle in creating such acoustic sensors is the exceedingly small value of the sound-induced force. In general, the miniature beams in these sensors respond at low frequencies to the pressure gradient force and to the viscous drag force, both associated with the passage of the acoustic wave. For example, a 10 mm long slender rod (100 µm OD) in a 100 µPa airborne 100 Hz sound wave (14 dBSPL=40 dB (relµPa)) experiences a total force of less than 1 pN. To provide a measurable mechanical deformation in response to the acoustically-induced flow the cantilever-type structure has to be extremely flexible. The associated low bending spring constant then limits the upper frequency that can be attained, and precludes wide bandwidth applications (practical aspects of handling ultrasoft cantilevers aside).

Embodiments of the present disclosure provide significantly improved detection levels and higher bandwidths for acoustic flow-based sensors that are attainable using micro/nano scale, two dimensional (2D) mesh-based structures, as opposed to essentially macroscale 1D cantilevers, as the transduction element. In an embodiment, the transduction element includes a planar mesh structure under significant tension immersed in an acoustic fluid. In an embodiment, the fact that the mechanical response of the mesh is controlled by the tensile stress, as opposed to bending rigidity of a cantilever, enables one to tailor the stiffness of the structure—i.e. to manipulate the resonant frequency and therefore the bandwidth of the device.

In an embodiment, an incident acoustic plane wave $p_i e^{i \vec{k} \circ \vec{r}}$ induces a force on each fiber of the mesh in the direction $\vec{k}$ of the plane wave due to both the pressure gradient across the fiber and the viscous drag force associated with the acoustic velocity field. In an embodiment, the cross section of the fibers comprising the mesh has a length and a width that is that significantly less (e.g., ten times less) than the viscous penetration depth in the medium for the frequency of interest.

Figure 3:
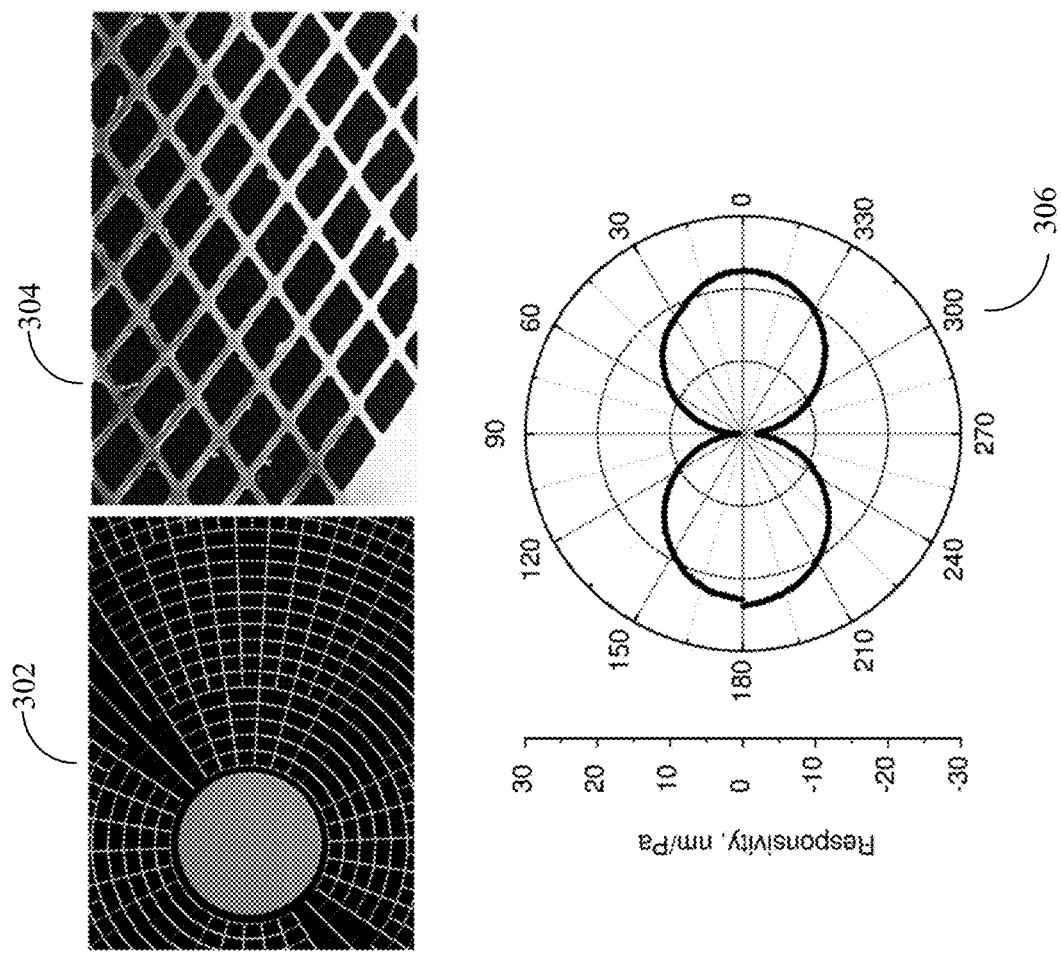
FIG. 3 shows diagrams of web geometry in accordance with an embodiment of the present disclosure.

In an embodiment, for microscale fibers, the viscous drag force is dominant and the pressure gradient force is negligible. The combination of the extra dimension and the micro/nano scale unit mesh size d provides a dramatic gain in the total length of the fiber exposed to the acoustically induced flow. In an embodiment, a square L×L filled with a fine mesh of unit size d contains the total fiber length $2L^2/d$, an increase by a factor 2L/d compared to a single cantilever of length L. The total normal force on the mesh can give rise to an out of plane displacement defined by the out-of-plane stiffness (associated with the tensile stress) of the overall mesh. Tangential forces may result in local deformation but do not result in out of plane displacements. Thus, in an embodiment, a measurement of the out-of-plane displacement of the mesh is expected to give rise to a natural cos θ (relative to the normal to the mesh) directivity associated with an incident pressure field. In a prototype of an embodiment of the present disclosure, just such a dipole directivity (e.g., as shown in FIG. 3) was observed, showing that three co-located orthogonal mesh transducers will allow one to reconstruct the wave vector of a sound wave in 3D space.

In an embodiment, analyzing the multi-scale, fluid-structure interaction (FSI) problem involving long-wavelength acoustic excitation of a micro/nano-scale mesh immersed in a viscous medium can be determined based on a theoretical model including an exact solution, fully including viscosity effects, for the acoustic response of two neighboring filaments. In an embodiment, an approximate solution for the response of the mesh can be determined based on a self-consistent, nearest neighbor approximation.

3. FLOATING BASE VECTOR SENSOR

Embodiments of the present disclosure provide a mesh-type (e.g., web-based) micromechanical structure that is designed to be sensitive to acoustically induced flow and can serve as a particle velocity, directional sensor for underwater or in-air acoustics. A floating base vector sensor in accordance with an embodiment of the present disclosure can determine the direction of arrival (DOA) for an acoustic signal of interest, while featuring a footprint orders of magnitude smaller than conventional beam-form arrays.

In an embodiment, a fine micro-fabricated web immersed in a viscous medium undergoes cyclic mechanical deformation (e.g., comparable to the stretching of a trampoline) in the presence of an acoustic excitation. In an embodiment, this deformation of the web can be detected using an optical probe. In an embodiment, the deformation is governed by the viscous forces due to oscillatory motion of the media particles in the sound wave. The directionality is provided by the fact that the out-of-plane deformation of the mesh strongly depends on the angle between the flow direction and the normal vector of the mesh. In an embodiment, by monitoring the deformation of the mesh (e.g., optically), one can extract information regarding both sound intensity and the orientation of the wave vector. In an embodiment, the combination of the two-dimensional (2D) nature of the mesh, together with the nano-scale dimensions, provides a dramatic gain in the total length of fiber exposed to the flow, leading to a sensitivity enhancement by orders of magnitude. In an embodiment, while strong coupling of the mesh to oscillatory motion of the media particles provides high sensitivity, the ability to tailor the resonant frequency of the web through built-in tension allows one to shape the frequency response of the device and to extend the bandwidth.

In an embodiment, the applicability of the web-based velocity sensor can be extended to the detection of sound waves in water in the vicinity of a pressure-release surface, which is the relevant impedance condition at the hull of most underwater vessels at low frequencies, e.g. submarines and autonomous underwater vehicles (AUVs). In an embodiment, a mesh-type velocity sensor in conjunction with the "floating base" method of deployment provides both high sensitivity and the ability to detect sound waves while being suspended in the medium, with no rigid anchoring required.

FIG. 1 is a diagram of a floating base vector sensor in accordance with an embodiment of the present disclosure. In FIG. 1, the floating base vector sensor includes a floating base 102, one or more (four shown in FIG. 1) flow meters 104 (e.g., viscous flow meters) attached to floating base 102, and a retaining thread 106 coupling floating base 102 to an anchor 108 (e.g., anchored to the ground).

In an embodiment, the floating base vector sensor is operated by invoking a combination of forces arising from acoustic scattering of the incoming sound wave by some parts of the vector sensor (i.e., floating base 102), as well as time-dependent viscous forces applied to other parts of the sensor (e.g., flow meters 104) by the surrounding water particles. In an embodiment, floating base 102 is suspended in water and is free to move in the directions of interest. In an embodiment, the size and the material of floating base 102 are chosen to maximize the acoustic forces caused by scattering of the incoming sound wave by the base. In an embodiment, these forces lead to a "recoil" motion of floating base 102 with respect to the media particles, and this relative motion can be detected by velocity sensor(s) attached to floating base 102 and extended far enough to be exposed to the "far field" media particles, unaffected by the recoil.

In an embodiment, the design of a mesh-type velocimeter is governed by two key observations: i) the acoustically induced flow force on an individual fiber within the mesh is nearly independent of the fiber diameter, and ii) the mesh-flow interaction can be well-described by a nearest neighbor coupling approximation. Scaling arguments based on these two observations indicate that the refinement of the mesh down to the nanoscale leads to significant improvements in performance. The combination of a two dimensional nature of the mesh together with the nano-scale mesh dimensions provides a dramatic gain in total length of the fiber exposed to the flow. For example, in an embodiment, a square L*L filled with a nano-scale mesh with spacing d contains the total fiber length $2L^2/d$, an increase by factor $2L/d$ compared to a single cantilever of length L. As a result, the sensitivity of a floating base vector sensor in accordance with an embodiment of the present disclosure can be enhanced by at least two orders of magnitude compared to cantilever based designs. In an embodiment, in the presence of a tensile stress, the mechanical response of the mesh is governed by the membrane-type forces (as opposed to bending rigidity in the case of cantilever-type devices), which provides the ability to tailor the resonant frequency of the web through built-in tension and allows one to shape the frequency response of the device and to extend the bandwidth.

In an embodiment, the "floating base" method of deployment takes advantage of both acoustic scattering and viscous forces combined. By choosing the average density of floating base 102 to be significantly different from the density of water, one can ensure that periodic motion of floating base 102 due to acoustic scattering differs significantly from the motion of the water particles in an unperturbed sound wave. Equation (1) below gives the velocity of the periodic motion of floating base 102 due to acoustic scattering effects:

$$u_r = \frac{A}{\rho c}\left(\frac{1}{3}ika\frac{k_b}{k} + \frac{3\rho}{2\rho_b + \rho}\right) \quad (1)$$

In Equation (1) above, $u_r$ is the motion of the base, c is the speed of sound in the medium, A is the amplitude of the pressure, a is the diameter of the base, k is a wave vector ($2\pi$/wavelength) $\rho$ is the density of the medium, $\rho_b$ is the density of the base, $\kappa$ is compressibility, and $\kappa_b$ is compressibility of the base.

In an embodiment, the mesh velocimeter attached to floating base 102 can be used as a readout for the resulting motion of the base with respect to the surrounding media. In an embodiment, the micromechanical flow-meter(s) 104 attached to floating base 102 will experience the corresponding enhancement in the speed of the surrounding fluid flow (compared to a rigidly fixed flow sensor) and therefore improved signal/noise ratio.

In one embodiment, floating base 102 can be a sphere made of a light material (e.g., $\rho_{base} \ll \rho_{water}$) that is moored (e.g., free to move in the XY plane) and the flow meters 104 are micromechanical flexible structures protruding orthogonally out of floating base 102. In an embodiment, flow meters 104 can be implemented as flexible rods (whiskers), planes (fins), or as meshed membranes that extend from floating base 102. In an embodiment, a means of providing the readout from the flow sensor can be rigidly attached to floating base 102. For example, for a micromechanical (mesh) sensor, it could be an optical readout of the deformation caused by the flow. In an embodiment, as the buoyancy of floating base 102 is not neutral (by design), floating base 102 is linked to anchor 108 that will define the operational depth, while permitting motion of floating base 102 in the directions of interest. Both fixed anchors and a floating anchor (with the means of regulating the depth) can be used with a floating base vector sensor in accordance with an embodiment of the present disclosure.

In an embodiment, the acoustic scattering force in the floating-base vector sensor is frequency-independent, therefore making the proposed floating-base vector sensor suitable for low frequency range. In an embodiment, the size of floating base 102 has to be only large enough to overpower the drag force applied to flow meters 104. Therefore the total size of the device can be quite small (an estimate of 10 mm radius for 10 Hz operation). The floating base vector sensor can be implemented as low cost, mass-produced device. In an embodiment, the floating base vector sensor can be deployed by unmanned devices (e.g., AUVs). The ability of the floating base vector sensor to measure the velocity of the water particles associated with the sound wave (as opposed to pressure) can enable implementations where the floating base vector sensor is mounted on the hull of the vessel (submarine, AUV, etc.) or moored in shallow waters, close to an air/water boundary.

A floating base vector sensor envisioned as a positive-buoyancy floating base 102 moored on anchor 108 in accordance with an embodiment of the present disclosure will be easy to deploy (e.g., in an embodiment, anchor 108 can include a battery, electronics necessary for operating the floating base vector sensor, and a means of communication to an external device, such as a transceiver, optical communication link, etc.).

Figure 2:
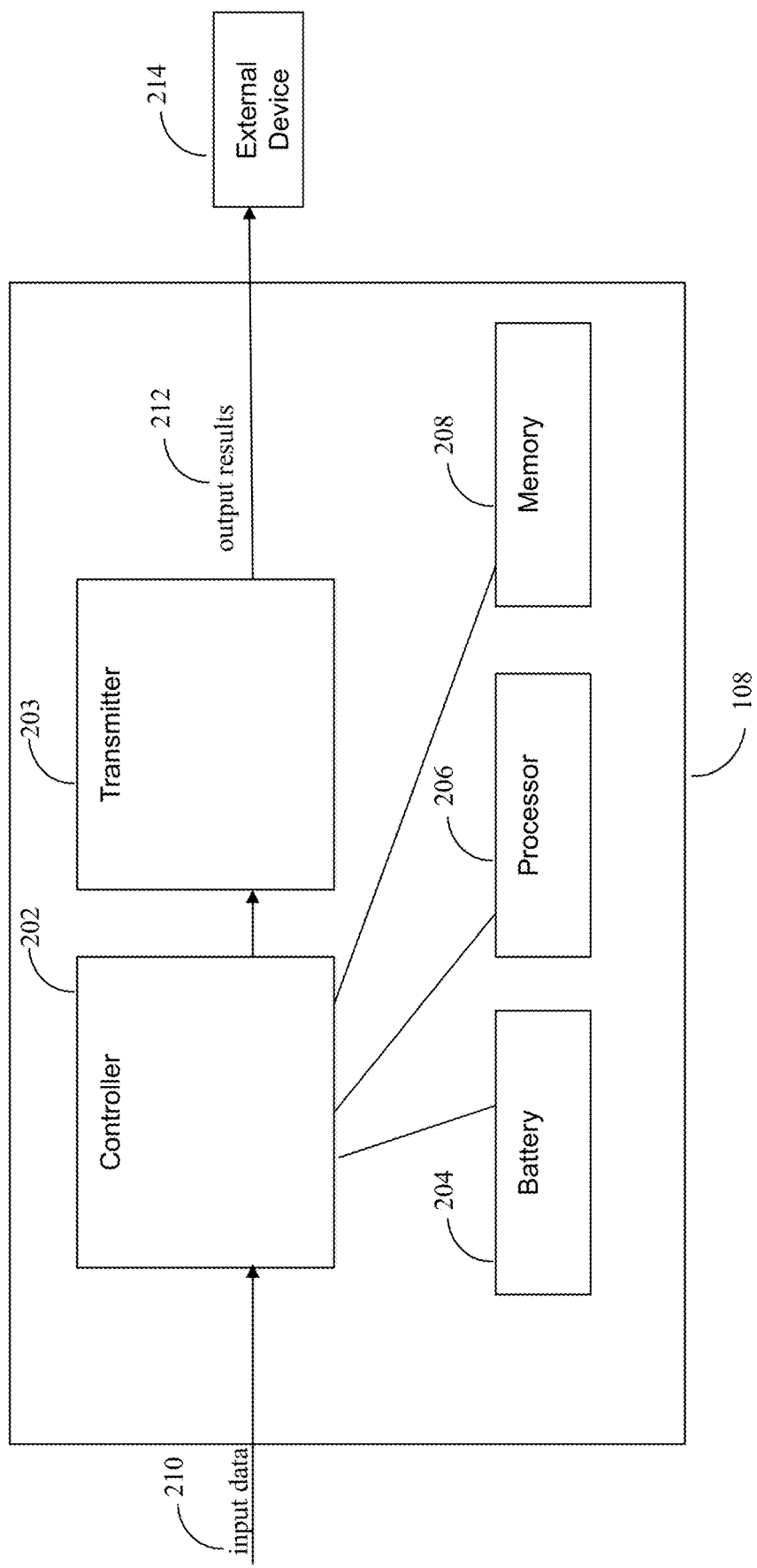
FIG. 2 shows a diagram of exemplary optional components of an anchor in accordance with an embodiment of the present disclosure.

FIG. 2 shows a diagram of exemplary optional components of anchor 108 in accordance with an embodiment of the present disclosure. For example, in an embodiment, anchor 108 is an anchor device configured to communicate (e.g., with an external device 214). In FIG. 2, anchor 108 includes a controller 202, transmitter 203, battery 204, processor 206, and memory 208. It should be understood that these components of anchor 108 are optional, and all or some components shown in FIG. 2 will not necessarily be present in every embodiment of the present disclosure. For example, in an embodiment, anchor device 108 may not include a separate processor 206 or memory 208 and will just include a controller 202 (e.g., a controller chip). In some embodiments, anchor 108 can include none of the components shown in FIG. 2, and data gathered by the floating base vector sensor can be gathered by a different device (e.g., a device attached to, and/or integrated into, floating base 102) for later collection. In some embodiments, such a device can include a transmitter for communication of this data to an external device 214.

In an embodiment, anchor 108 can receive input data 210. For example, in an embodiment, vector sensor measurement data (e.g., including DOA data) can be communicated to anchor 108. In an embodiment, anchor 108 can include a light source coupled to the optical link(s) that deliver light to flow meters 104 and a receiving link that delivers input data 210 from flow meters 104. In an embodiment, this data can (optionally) be processed (e.g., using controller 202 and/or processor 206) and communicated to an external device 214 (e.g., using transmitter 203, a transceiver, an optical link, etc.). In an embodiment, controller 202 and transmitter 203 can also be used to communicate information to the floating base vector sensor (e.g., to reconfigure components and/or parameters of the floating base vector sensor).

For example, in an embodiment, the fine micro-fabricated webs of flow meters 104 immersed in a viscous medium, such as water, undergo cyclic mechanical deformation in the presence of an acoustic excitation. In an embodiment, this deformation of the web can be detected using an optical probe (e.g., coupled to flow meters 104 and/or to floating base 102). In an embodiment, by monitoring the deformation of the mesh (e.g., optically), one can extract information regarding both sound intensity and the orientation of the wave vector. In an embodiment, the optical probe is configured to transmit this monitored deformation information as input data to anchor 108. For example, in an embodiment, the optical link coupled to flow meters 104 can be run along retaining thread 106 to anchor 108. In an embodiment, anchor 108 can include a velocimeter (e.g., as part of or coupled to controller 202) configured to extract information measured by flow meters 104. In an embodiment, one or more velocimeters can be coupled to floating base 102 configured to extract information measured by flow meters 104.

In an embodiment, data can be encrypted before being transmitted as output results 212 to external device 214. For example, in an embodiment, controller 202 and/or an encryption module inside, or coupled to, anchor 108 can be configured to encrypt data before it is sent to transmitter 203 for transmission to external device 214.

External device 214 can be a number of devices in accordance with embodiments of the present disclosure. For example, in an embodiment, external device 214 can be a ship, a floating buoy device, a land-based receiver, etc. In an embodiment, external device 214 can be a central controller configured to aggregate data from multiple floating base vector sensors. In an embodiment, external device 214 can be configured to receive data from a single floating base vector sensor. In an embodiment, anchor 108 further includes a receiver configured to receive information from external device 214. In an embodiment, anchor 108 (and/or other components of the floating base vector sensor) can be configured to decrypt and verify information received from external device 214.

Components of anchor 108 and/or of any other processing device coupled to the floating base vector sensor of FIG. 1 can be implemented using hardware, software, and/or a combination of hardware and software. Components of anchor 108 and/or of any other processing device coupled to the floating base vector sensor of FIG. 1 can be implemented using a single device or multiple devices. For example, in an embodiment, components of anchor 108 can be implemented using a single integrated circuit (chip). In an embodiment, components of anchor 108 and/or of any other processing device coupled to the floating base vector sensor can be implemented using a general purpose computer or a special purpose device configured to communicate with components of the floating base vector sensor of FIG. 1.

4. FABRICATION AND EXPERIMENTAL MEASUREMENTS

A "spider web" geometry with 6 mm outer diameter (OD) was chosen as a prototype of the mesh sensor in accordance with an embodiment of the present disclosure, fabricated in 1 μm-thick LPCVD (low pressure chemical vapor deposition) grown, ultra-low stress silicon nitride film. A combination of optical lithography and reactive ion etch was used to form the suspended web structure with the support frame carved in the underlying silicon wafer using deep reactive ion etch. With the filament separation reduced to d=20 even such a small area (6 mm OD) can accommodate a total length of the fibers≈2.7 meters, a dramatic increase compared to a 50 mm long cantilever.

Ignoring the coupling between the filaments of the mesh, the (sound-induced) oscillatory drag force acting on a particular filament has a weak logarithmic dependence on the fiber diameter for the very small Reynold's numbers in typical sound induced flow (Re~$10^{-6}$-$10^{-9}$). The filaments for the mesh can thus be made extremely fine, 3.6 μm×1 μm in our prototype, with the total drag force on the mesh being proportional to the total length of the mesh. The normal component of the drag force produced by the oscillatory motion of the medium particles causes an out-of-plane deformation of the mesh, akin to the stretching of a trampoline. In an exemplary embodiment, an optical interferometer can be used to detect the oscillatory displacement of a microfabricated mirror placed at the center of a 'spider web' mesh. In an embodiment, the extra weight associated with the mirror (30 nm-thick aluminum film in our prototype) is small compared to the mass of silicon nitride mesh and can be further reduced.

By controlling the tensile stress in the fibers, one can ensure that the mechanical response of the mesh is governed by membrane stresses, in contrast to the bending rigidity governed cantilever. A wide range of tunability attainable through the adjustment of the pre-stress is a useful feature in designing the frequency response of the mechanical sensor. Given the low mass of the mesh, even a minimal amount of tension can provide the high resonant frequency (530 Hz as a fundamental frequency for our prototype) critical for wide bandwidth devices.

In an embodiment, in-air evaluation of the velocimeter confirmed a dipole-type directionality with peak responsivity in excess of 20 nm/Pa at 90 Hz (e.g., as shown in FIG. 3). The total force acting on the mesh can be extracted from the measured mirror displacement and the estimated spring constant of the web. At 90 Hz, the estimated value exceeds the force that would be acting on a single cantilever (for the same sound intensity) by orders of magnitude, a direct outcome of the increased fiber length.

FIG. 3 shows diagrams of web geometry in accordance with an embodiment of the present disclosure. Image 302 shows a diagram of web geometry showing a mirror at the center and beam truncation required to maintain a desired beam separation. Image 304 is an SEM image of the released web with beam separation 20 μm. Diagram 306 shows directionality of the web with OD=6 mm and beam separation 20 μm acquired at 90 Hz.

While the demonstrated level of mechanical sensitivity of 20 nm/Pa is comparable to that of a typical (nondirectional) MEMS microphone, the geometry of the mesh velocimeter precludes the use of the capacitive readout and puts an emphasis on optical transduction. Considering the noise floor imposed by the interferometer≈2 pm/$\sqrt{Hz}$ as a major limiting factor, one can estimate a minimum detectable sound pressure in air as $MDP_{air}$≈100 μPa. In air, the performance of our first mesh prototype is close to that of a "state-of-the-art" heat flow-based "Microflown" velocity sensor (MDP≈20 μPa). In water, the equivalent amount of the drag force would be generated by a sound wave with the pressure spectral density $MDP_{water}$≈76 dB (relμPa)/$\sqrt{Hz}$. We find it remarkable that the first prototype would project an MDP close to "Sea State Zero" in shallow waters—SS0≈65 dB (relμPa)/$\sqrt{Hz}$ at 100 Hz, level of ambient noise expected in ocean 180 m below the surface on a calm day.

Figure 4:
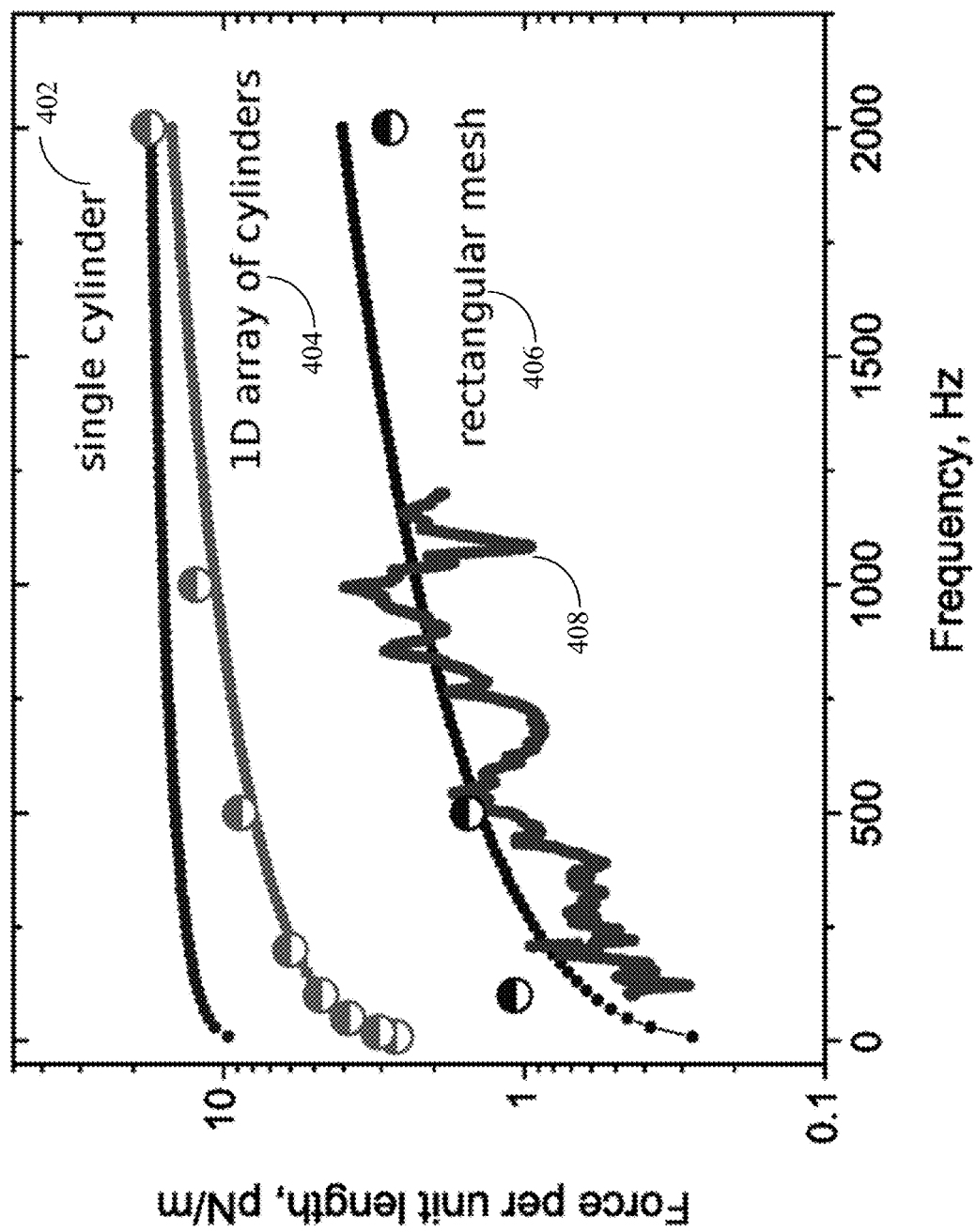
FIG. 4 shows estimates of acoustic drag force for an embodiment of the present disclosure.

FIG. 4 shows estimates of acoustic drag force for an embodiment of the present disclosure. Specifically, FIG. 4 shows estimates of the acoustic drag force per unit length (in picoNewtons) imposed by a 100 μPa acoustic sound pressure in air (0.24 μm/s flow velocity) in accordance with an embodiment of the present disclosure. The top plot 402 is for an isolated cylinder. The middle plot 404 is for a linear array of fibers with separation 20 μm. The bottom plot 406 is for a rectangular mesh with a fiber separation 20 μm. The dimensions for the theoretical calculations match the actual dimensions of the "spider web" sensor in accordance with an embodiment of the present disclosure. The experimental data is graphed by plot 408. The results of the numerical simulations for the corresponding linear 1D array (half-solid circles on plot 404) and mesh (half-solid circles on plot 406) are shown for comparison. Note that the total force "captured" by a flow sensor is calculated as a product of the "force per unit length" shown in the figure and the total length of all the branches in the mesh. The logarithmic decrease in the force/length shown in FIG. 4, associated with the interaction between the web fibers, is outweighed by increasing length as the mesh is made finer.

5. EXEMPLARY ALTERNATIVES

In an embodiment, a mesh-type micromechanical transducer can be employed as a DC flow meter (velocimeter) with the advantage of small footprint and ability to implement the mesh and optical readout using corrosive-resistant materials.

In an embodiment, for operation at an adjustable depth, the floating "base" can be supported by a body with controlled buoyancy (as opposed to an anchor). In such an implementation, the buoyancy of the floating base can be chosen as either positive or negative.

In an embodiment, the floating base can have a complicated design optimized in order to enhance the water flow at the locations of the flow sensors (aka acoustic horn).

In an embodiment, a low symmetry (non-spherical) floating base can provide additional directional selectivity for detecting sound waves.

In an embodiment, implementations where the floating base has both, high density parts and low density parts can enable differential measurements for subtracting slow changing water flow (e.g. associated with currents).

In an embodiment, the design of the flow sensor attached to the floating base can vary. For micromechanical flow sensors, the variation can include both the geometry of the sensor (cantilever, plate, porous plate, mesh, etc.) as well as the readout mechanism (optical—intensity based, interferometric, grating-based, electrical—piezoelectric, piezoresistive, capacitive, etc.).

In an embodiment, with multiple flow sensors oriented in different directions in respect to the base, one can implement a higher-order vector sensor with improved directivity.

In an embodiment, to enhance the coupling between the flow sensor and surrounding fluid, the entire vector sensor can be placed in an sound-permeable enclosure filled with high viscosity fluid, that is acoustically matched to water.

6. CONCLUSION

In accordance with embodiments of the present disclosure, the shift from a 1D to a 2D geometry leads to significant performance gains while expanding the bandwidth. In an embodiment, the scaling transformation x→sx (s<1, x denotes the mesh parameters a and d), leads to sensitivity enhancements in proportion to the scale factor $s^{-2}f(sqd)$, while the penalty resulting from the coupling between the mesh fibers (the factor f(sqd)) is weak (logarithmic). In the low frequency limit, the responsivity of the mesh velocimeter exhibits logarithmic frequency dependence defined by the interplay between the mesh unit size and frequency-dependent viscous penetration depth. This represents a significant improvement compared to the 1/ω fall off featured by accelerometers and opens possibilities for infrasonic applications. Further, we have found that the mesh sensors are robust and straightforward to fabricate.

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented using computer processors, computer logic, application specific integrated circuits (ASIC), digital signal processors, etc., as will be understood by those skilled in the art based on the discussion given herein. Accordingly, any processor that performs the signal processing functions described herein is within the scope and spirit of the present disclosure.

The above systems and methods may be implemented as a computer program executing on a machine, as a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g., software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. A vector sensor, comprising:
   a base;
   a flow meter coupled to the base, wherein the flow meter is configured to detect a direction of arrival (DOA) of an acoustic signal, and wherein the flow meter comprises a two-dimensional mesh having a micro or nano scale unit mesh size;
   a retaining thread coupled to the base; and
   an anchor device, coupled to the retaining thread, configured to
      receive an incoming signal corresponding to the detected DOA of the acoustic signal, and
      transmit a signal corresponding to the detected DOA of the acoustic signal to an external device.

2. The vector sensor of claim 1, wherein the anchor device further comprises:
   a battery;
   a transmitter; and
   a controller.

3. The vector sensor of claim 1, wherein the vector sensor further comprises:
   an optical link coupled to the anchor device, wherein the anchor device is configured to receive the incoming signal via the optical link.

4. The vector sensor of claim 1, wherein the anchor device is configured to determine, based on the incoming signal, a relative motion of the base with respect to a surrounding environment.

5. The vector sensor of claim 1, wherein the two-dimensional mesh has a micro scale unit mesh size.

6. The vector sensor of claim 1, wherein the two-dimensional mesh has a nano scale unit mesh size.

7. The vector sensor of claim 1, further comprising a plurality of flow meters, including the flow meter, coupled to the base.

8. The vector sensor of claim 7, wherein the plurality of flow meters comprise four flow meters.

9. The vector sensor of claim 1, wherein the flow meter is configured to detect a flow passing through the two-dimensional mesh.

10. The vector sensor of claim 9, wherein the flow meter further comprises an optical link, wherein the optical link is configured to generate a signal based on the detected flow based on a deformation of the two dimensional mesh initiated by the flow.

11. The vector sensor of claim 10, wherein the two-dimensional mesh comprises a plurality of fibers, and wherein a length and a width of a cross section of a fiber in the plurality of fibers is less than a viscous penetration depth in a medium in which the base is submerged for a frequency of interest.

12. The vector sensor of claim 9, further comprising a velocimeter coupled to the two-dimensional mesh.

13. The vector sensor of claim 1, wherein the base has a non-neutral buoyancy.

14. A method, comprising:
   detecting, using a flow meter having a two-dimensional mesh of a micro or nano scale unit mesh size, a direction of arrival (DOA) of an acoustic signal;
   receiving an incoming signal corresponding to the detected DOA of the acoustic signal; and
   transmitting a signal corresponding to the detected DOA of the acoustic signal to an external device.

15. The method of claim 14, wherein detecting the DOA of the acoustic signal comprises detecting a flow passing through the two-dimensional mesh.

16. The method of claim 15, wherein transmitting the signal corresponding to the detected DOA of the acoustic signal to the external device comprises generating a signal based on the detected flow based on a deformation of the two dimensional mesh initiated by the flow.

17. A vector sensor, comprising:
   a flow meter, wherein the flow meter is configured to detect a direction of arrival (DOA) of an acoustic signal, and wherein the flow meter comprises a two-dimensional mesh having a micro or nano scale unit mesh size; and
   a device, coupled to the flow meter, configured to:
      receive an incoming signal corresponding to the detected DOA of the acoustic signal, and
      transmit a signal corresponding to the detected DOA of the acoustic signal to an external device.

18. The vector sensor of claim 17, wherein the two dimensional mesh has a micro scale unit mesh size.

19. The vector sensor of claim 18, wherein the two-dimensional mesh has a nano scale unit mesh size.

20. The vector sensor of claim 19, wherein the flow meter is configured to detect a flow passing through the two-dimensional mesh.

\* \* \* \* \*